United States Patent
Okubo

(10) Patent No.: US 10,536,621 B2
(45) Date of Patent: Jan. 14, 2020

(54) IMAGE CAPTURING APPARATUS, STORAGE MEDIUM AND CONTROLLING METHOD FOR CORRECTING A SECOND IMAGE BY CORRECTING A PIXEL VALUE OF THE SECOND IMAGE CORRESPONDING TO A DETECTED DEFECTIVE PIXEL

(71) Applicant: CANON KABUSHIKI KAISHA, Tokyo (JP)

(72) Inventor: Toshiyuki Okubo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 15/784,291

(22) Filed: Oct. 16, 2017

(65) Prior Publication Data

US 2018/0109718 A1    Apr. 19, 2018

(30) Foreign Application Priority Data

Oct. 19, 2016 (JP) ................................. 2016-205522
Aug. 29, 2017 (JP) ................................. 2017-164419

(51) Int. Cl.
*H04N 9/64* (2006.01)
*H04N 5/232* (2006.01)
*H04N 5/367* (2011.01)

(52) U.S. Cl.
CPC ....... *H04N 5/23212* (2013.01); *H04N 5/3675* (2013.01); *H04N 5/23293* (2013.01)

(58) Field of Classification Search
CPC .................................................. H04N 5/3675
See application file for complete search history.

(56) References Cited

U.S. PATENT DOCUMENTS

| 2013/0265295 | A1* | 10/2013 | Ogawa | G09G 5/003 |
| | | | | 345/214 |
| 2014/0125847 | A1* | 5/2014 | Yasuda | H04N 5/367 |
| | | | | 348/242 |
| 2014/0146196 | A1* | 5/2014 | Shoda | H04N 5/23212 |
| | | | | 348/222.1 |
| 2016/0344920 | A1* | 11/2016 | Iwahara | H04N 5/347 |

FOREIGN PATENT DOCUMENTS

JP    2015-080123 A    4/2015

* cited by examiner

*Primary Examiner* — Gary C Vieaux
(74) *Attorney, Agent, or Firm* — Cowan, Liebowitz & Latman, P.C.

(57) ABSTRACT

To perform high-accurate correction while securing high-speed process, an image capturing apparatus comprises: an image capturing element having plural unit pixels; a first obtainer obtaining a pixel value of a first image generated by a first method, based on an output signal of the image capturing element; a second obtainer obtaining a pixel value of a second image for autofocus generated by a second method different from the first method, based on the output signal of the image capturing element; a first detector detecting a defective pixel based on the pixel value of the first image; a second detector detecting a defective pixel based on information of the defective pixel detected by the first detector and the pixel value of the second image; and a corrector correcting the second image, by correcting the pixel value of the second image corresponding to the defective pixel detected by the second detector.

18 Claims, 10 Drawing Sheets

| DEFECT LEVEL | DEFECT DETECTION THRESHOLD |
|---|---|
| DEFECT LEVEL ≥ Th_A1 (HIGH) | Th_B1 (LOW) |
| Th_A1 (HIGH) > DEFECT LEVEL ≥ Th_A2 (MEDIUM) | Th_B2 (MEDIUM) |
| Th_A2 (MEDIUM) > DEFECT LEVEL ≥ Th_A3 (LOW) | Th_B3 (HIGH) |
| NO DETECTION | Th_B4 (MAXIMUM) |

| CORRECTION DIRECTION | CORRECTING METHOD |
|---|---|
| HORIZONTAL DIRECTION | SIMPLIFIED CORRECTION |
| OBLIQUE DIRECTION | POSTERIOR CORRECTION |
| VERTICAL DIRECTION | POSTERIOR CORRECTION |

IMAGE CAPTURING APPARATUS, STORAGE MEDIUM AND CONTROLLING METHOD FOR CORRECTING A SECOND IMAGE BY CORRECTING A PIXEL VALUE OF THE SECOND IMAGE CORRESPONDING TO A DETECTED DEFECTIVE PIXEL

BACKGROUND OF THE INVENTION

Field of the Invention

The present invention relates to an image capturing apparatus, a controlling method for controlling the image capturing apparatus, and a storage medium of storing a program for controlling the image capturing apparatus.

Description of the Related Art

In recent years, image capturing equipment (imaging equipment, image pickup equipment) such as a home video camera, a digital still camera and the like has been widely spread. In general, each of these cameras has an AF (auto-focus) function for automatically adjusting a focus position of a lens, so that a user can perform photographing (shooting, filming) by leaving the camera to adjust the focus position without doing so himself. This function is beneficial to the user.

Incidentally, an AF mechanism using an image capturing element is roughly classified into two kinds, that is, a contrast AF method and an image capturing surface phase difference AF method. In the contrast AF method, usually, an output from an image capturing pixel is filtered, a position where a filter output becomes maximum is found while driving a focus lens, and thus a focus position is obtained. Although this system is simple, it has a problem of requiring time. On the other hand, in the image capturing surface phase difference AF method, there are provided divided pixels for ranging in an image capturing element, a defocus amount is obtained from an output phase difference of the divided pixels for ranging, and thus a focus position is obtained. In this method, since the defocus amount is obtained from an image of one frame, there is a merit that the time required for autofocus is very short. On the other hand, since the image capturing element contains a defective pixel having an abnormal output and the defective pixel like this affects ranging performance of the image capturing surface phase difference AF, it is necessary to correct a defect (or flaw).

As a technique related to correction of a defective pixel, Japanese Patent Application Laid-Open No. 2015-80123 discloses such an image capturing apparatus as described below. That is, the image capturing apparatus described in Japanese Patent Application Laid-Open No. 2015-80123 comprises an image capturing element, a storage unit for storing information related to focus detection pixels and defective pixels of the image capturing element in a compressed state, and a decoding unit for decoding the compressed information of the focus detecting pixels and the defective pixels. The image capturing apparatus described in Japanese Patent Application Laid-Open No. 2015-80123 further comprises a signal separating unit for separating a focus detection signal obtained from the focus detection pixels out of pixel signals based on the information decoded by the decoding unit, and a signal interpolating unit. Here, the signal interpolating unit interpolates the pixel signal corresponding to the defective pixel based on the information decoded by the decoding unit.

SUMMARY OF THE INVENTION

An image capturing apparatus according to the present invention is characterized by comprising: an image capturing element configured to be equipped with a plurality of unit pixels; a first obtaining unit configured to obtain a pixel value of a first image generated by a first method, on the basis of an output signal of the image capturing element; a second obtaining unit configured to obtain a pixel value of a second image for autofocus generated by a second method different from the first method, on the basis of the output signal of the image capturing element; a first detecting unit configured to detect, in the unit pixels, a defective pixel which is abnormally output, on the basis of the pixel value of the first image; a second detecting unit configured to detect a defective pixel based on information of the defective pixel detected by the first detecting unit and the pixel value of the second image; and a correcting unit configured to correct the second image, by correcting the pixel value of the second image corresponding to the defective pixel detected by the second detecting unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
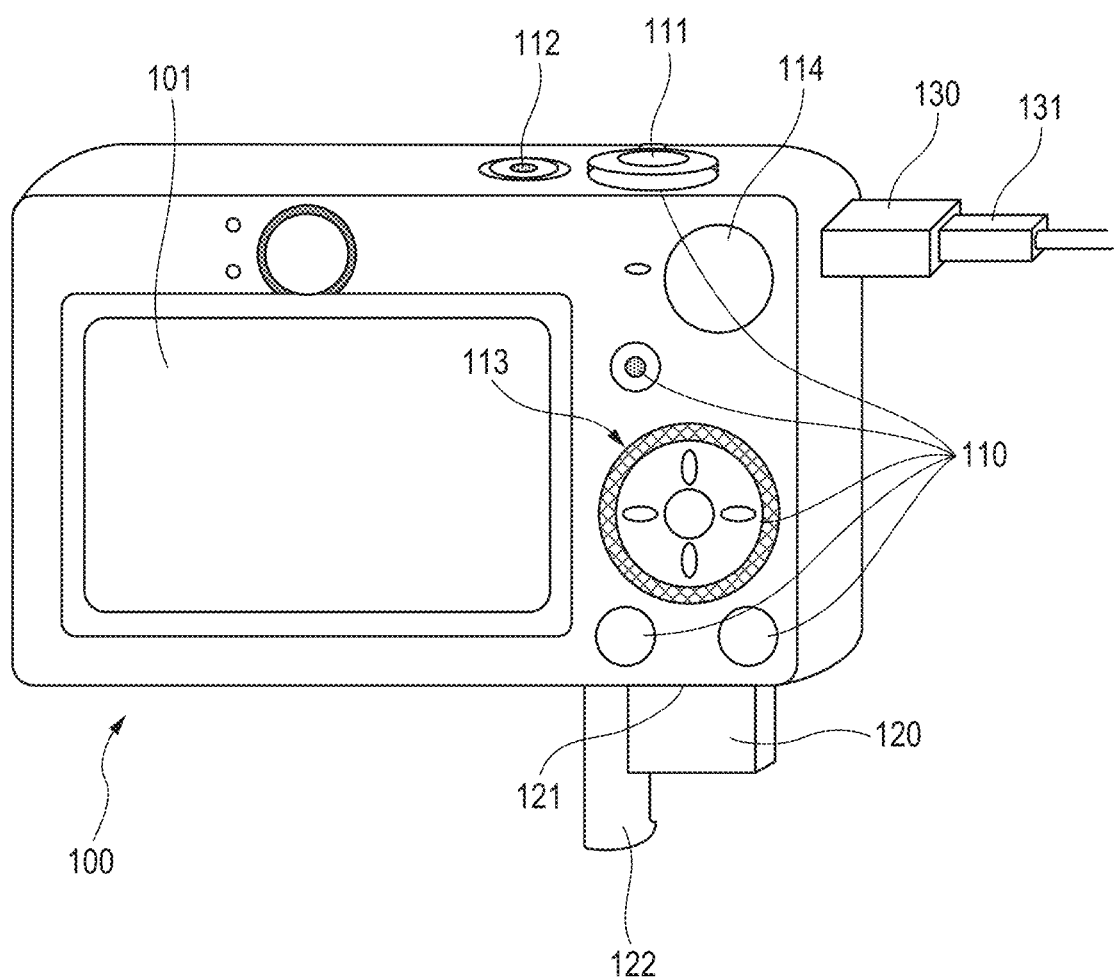
FIG. 1 is an appearance diagram of a digital camera.

First, a hardware constitution of a digital camera 100 which is an example of an image capturing apparatus will be described with reference to FIG. 1. Namely, FIG. 1 is the appearance diagram of the digital camera 100.

A displaying unit 101 is a displaying unit which displays images and various kinds of information.

An operating unit 110 is constituted by operation members such as various switches, various buttons, a touch panel and the like for accepting various operations from a user. Besides, the operating unit 110 comprises a shutter button 111, a mode changeover switch 114, a power supply switch 112 and a controller wheel 113.

The shutter button 111 is an operating unit for generating a photographing instruction.

The power supply switch 112 is a switch which is used for an operation of changing over a power state between power on and power off for the digital camera 100.

The controller wheel 113 is a rotatable operation member which is included in the operating unit 110.

The mode changeover switch 114 is a switch for changing over various modes.

A recording medium 120, which is a recording (or storage) medium such as a memory card, a hard disk or the like, is used to record photographed and captured images and the like.

A recording medium slot 121 is a slot for storing the recording medium 120. The recording medium 120 stored in the recording medium slot 121 can communicate with the digital camera 100.

A lid 122 is a lid of the recording medium slot 121.

A connector 130 is a connector which is provided between a connection cable 131 and the digital camera 100.

Figure 2:
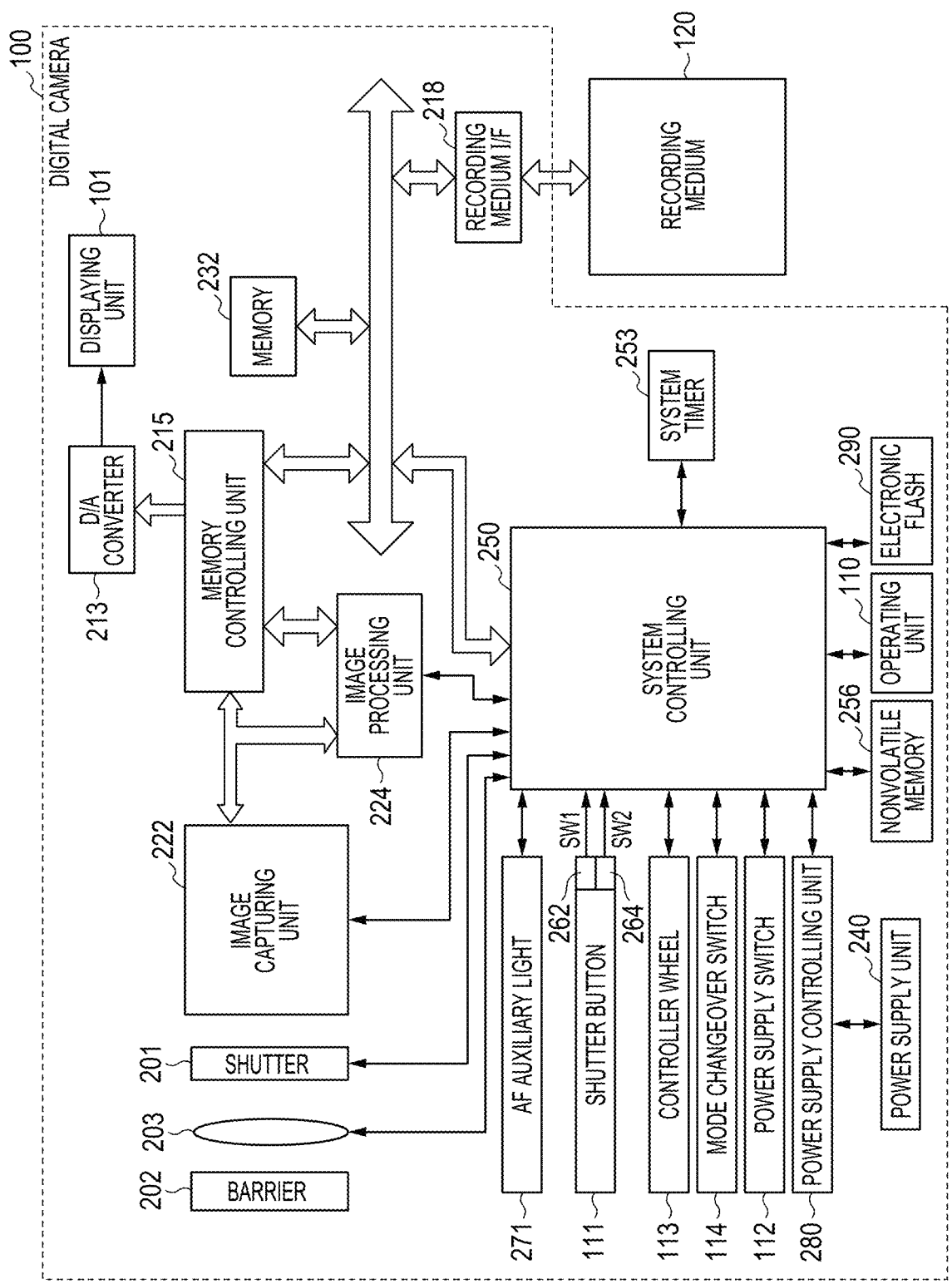
FIG. 2 is a block diagram for describing a hardware constitution of the digital camera.

Next, a hardware constitution of the digital camera 100 will be described with reference to FIG. 2. Namely, FIG. 2 is the block diagram for describing the hardware constitution of the digital camera 100.

A photographing lens 203 is a lens group which includes a zoom lens and a focus lens.

A shutter 201 is a shutter which has a stop function.

An image capturing (or image pickup) unit 222 comprises image capturing elements each of which is composed of a CCD (charge-coupled device), a CMOS (complementary metal oxide semiconductor) element or the like for converting an optical image into an electric signal, and an A/D (analog-to-digital) converting unit which performs A/D conversion.

A barrier 202 covers an image capturing system including the photographing lens 203 of the digital camera 100, thereby preventing contamination and breakage of the image capturing system including the photographing lens 203, the shutter 201 and the image capturing unit 222.

An image processing unit 224 performs a resizing process such as predetermined pixel interpolation, reduction or the like, and a color converting process, in regard to data output from the image capturing unit 222 or data output from a memory controlling unit 215. Further, the image processing unit 224 performs a predetermined arithmetic process using image data obtained by image capture. Based on a calculation result by the image processing unit 224, a system controlling unit 250 performs exposure control and ranging control. Thus, an AE (automatic exposure) process of a TTL (through-the-lens) method, and an EF (electronic flash automatic dimming light emission) process are performed. The image processing unit 224 further performs a predetermined arithmetic process using the image data obtained by the image capture, and performs an AWB (automatic white balance) process of the TTL method based on an obtained calculation result.

Output data of the image capturing unit 222 is written into a memory 232 via the image processing unit 224 and the memory controlling unit 215, or via the memory controlling unit 215.

The memory 232, which is a system memory, uses a RAM (random access memory). In the memory 232, constants and variables for operations of the system controlling unit 250, programs read from a nonvolatile memory 256, and the like are expanded. Further, the memory 232 stores therein the image data obtained and A/D-converted by the image capturing unit 222, and image data to be displayed (image display data) on the displaying unit 101.

Besides, the memory 232 has a sufficient storage capacity to store a predetermined number of still images, a predetermined time of moving images, and a predetermined time of sounds or voices. The memory 232 also serves as a memory (video memory) for displaying images.

A D/A (digital-to-analog) converter 213 converts the image display data stored in the memory 232 into an analog signal, and supplies the converted signal to the displaying unit 101. Thus, the image display data written and stored in the memory 232 is displayed on the displaying unit 101 via the D/A converter 213.

The displaying unit 101 performs, on a display such as an LCD (liquid crystal display) or the like, display according to the analog signal from the D/A converter 213. The D/A converter 213 converts the digital signal once A/D-converted by the image capturing unit 222 and stored and accumulated in the memory 232 into the analog signal and sequentially transfers the converted analog signals to the displaying unit 101, and the displaying unit 101 displays the converted analog signals. Thus, an electronic viewfinder is realized, so that through image display can be performed.

The system controlling unit 250 entirely controls the digital camera 100. By executing the program recorded or stored in the memory 232 with the system controlling unit 250, each of later-described functions of the digital camera 100 is realized. Besides, the system controlling unit 250 performs display control by controlling the memory 232, the D/A converter 213, the displaying unit 101 and the like.

The nonvolatile memory 256 is an electrically erasable/recordable memory, and, for example, a flash memory or the like is used as the nonvolatile memory. In the nonvolatile memory 256, constants for the operation of the system controlling unit 250, programs, and the like are stored. The program herein includes programs for performing processes described in later-described various flow charts in the present embodiment, and programs for realizing later-described various functions.

A system timer 253 is a timing unit which measures time used for various controls, and time of a built-in clock.

A mode changeover switch 114, a first shutter switch 262, a second shutter switch 264, and the operating unit 110 are operation units for inputting various operation instructions to the system controlling unit 250.

The mode changeover switch 114 changes over the operation mode of the system controlling unit 250 to one of a still image photographing (or recording) mode, a moving image photographing (or recording) mode, a reproduction mode, and the like. As modes included in the still image recording mode, there are an automatic photographing mode, an automatic scene discriminating mode, a manual mode, various scene modes which are photographing setting for each photographing scene, a program AE mode, a custom mode, and the like. The mode changeover switch 114 directly changes over the operation mode to one of these modes included in the still image photographing mode. Here, it may be possible to, after once changing over the operation mode to the still image photographing mode by the mode changeover switch 114, further change over the operation mode to any one of these modes included in the still image photographing mode by using another operation member. Likewise, a plurality of modes may be included in the moving image photographing mode.

The first shutter switch 262 is turned on during an operation of a shutter button 111 provided in the digital camera 100, that is, by so-called half depression (photographing preparation instruction), and generates a first shutter switch signal SW1. Then, operations such as an AF (autofocus) process, an AE (automatic exposure) process, an AWB process, an EF process, and the like are started in response to the first shutter switch signal SW1.

The second shutter switch 264 is turned on by completion of the operation of the shutter button 111, that is, by so-called full depression (photographing instruction), and generates a second shutter switch signal SW2. In response to the second shutter switch signal SW2, the system controlling unit 250 starts a series of photographing process operations from signal readout from the image capturing unit 222 to image data writing to the recording medium 120.

A function is appropriately assigned to each of operation members of the operating unit 110 for each scene on the condition that, for example, each of various function icons displayed on the displaying unit 101 is selected and operated by the user, so that the operation members respectively function as various function buttons. Examples of the function buttons include an end button, a return button, an image advance (forward) button, a jump button, a narrow-down button, an attribute change button, and the like. More specifically, when a menu button is depressed, a menu screen enabling various settings is displayed on the displaying unit 101. The user can intuitively perform various settings by using the menu screen displayed on the displaying unit 101, four-direction (up, down, left and right) buttons, and a SET button.

Under the control of the system controlling unit 250, an AF auxiliary light 271 emits light at low luminance to illuminate a subject (object).

The controller wheel 113 is the rotatable operation member included in the operating unit 110, and is used, for example, for instructing selection items together with the direction buttons. When the controller wheel 113 is rotated, an electrical pulse signal is generated according to an operation amount of the wheel, and the system controlling unit 250 controls each unit of the digital camera 100 based on the generated pulse signal. With this pulse signal, the system controlling unit 250 can decide a rotation angle of the controller wheel 113, the number of rotations, and the like. It should be noted that the controller wheel 113 may be of any kind as long as it can detect a rotation operation. For example, it may be possible to use a dial operation member which generates the pulse signal by rotating the controller wheel 113 itself according to the rotation operation by the user. Further, it may be possible to use an operation member which is constituted by a touch sensor (so-called touch wheel). In the touch wheel like this, the controller wheel 113 itself does not rotate, and a rotational motion or the like of a user's finger on the controller wheel 113 is detected.

A power supply controlling unit 280 is constituted by a battery detecting circuit, a DC-DC (direct current-direct current) converter, a switching circuit for changing over (switching) blocks to be energized, and the like, and detects presence/absence of an installed battery, a kind of battery, and a remaining battery level. Besides, the power supply controlling unit 280 controls the DC-DC converter based on the detection result and an instruction from the system controlling unit 250, and supplies necessary voltages to each unit including the recording medium 120 for a necessary period of time.

A power supplying unit 240 is constituted by a primary battery such as an alkaline battery, a lithium battery or the like, a secondary battery such as a NiCd battery, a NiMH battery, a Li battery or the like, an AC (alternate current) adapter, and the like.

A recording medium I/F (interface) 218 is an interface with the recording medium 120 such as a memory card, a hard disk or the like.

An electronic flash 290 is a light emitting device, and is selectively controlled to emit light by the system controlling unit 250 at the time of photographing. For example, the electronic flash illuminates a subject so as to compensate illuminance lacking in a low-luminance photographing scene or a backlight scene.

(Constitution of Image Capturing Element)

Figure 3:
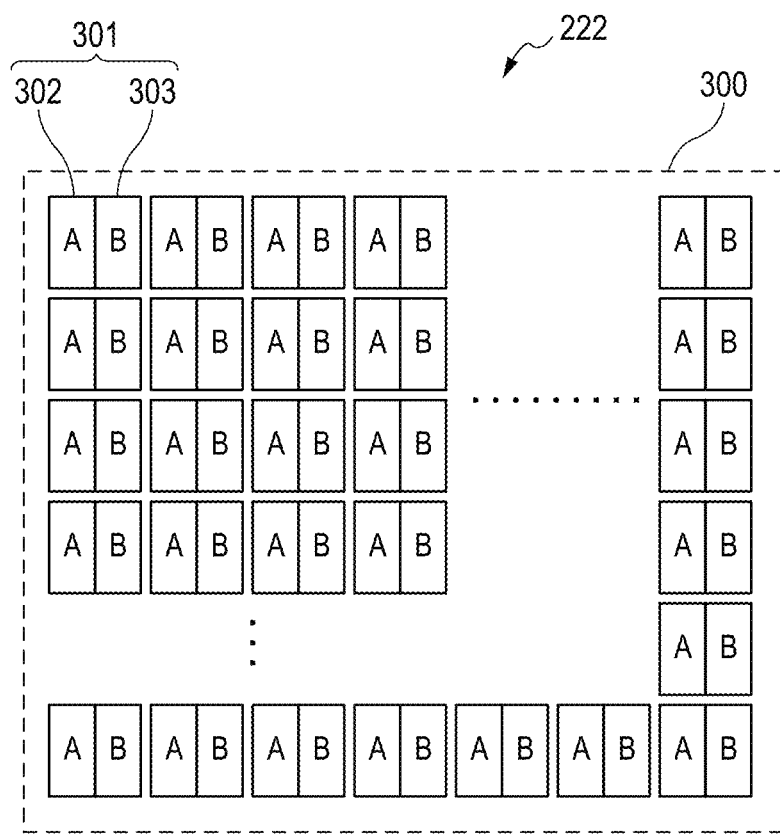
FIG. 3 is a block diagram for describing a constitution of an image capturing element.

Next, an image capturing element (or image sensor) 300 which constitutes the image capturing unit 222 will be described with reference to FIG. 3. Namely, FIG. 3 is the block diagram for describing the constitution of the image capturing element 300.

The image capturing element 300 comprises a plurality of unit pixels 301. Each of the unit pixels 301, which is pupil-divided (pupil-split), comprises an A pixel 302 serving as a first photoelectric converting unit, a B pixel 303 serving as a second photoelectric converting unit, and an FD (floating diffusion) portion. Each of the A pixel 302 and the B pixel 303 is a light receiving element, and can detect intensity of light. A photodiode is used for each of the A pixel 302 and the B pixel 303. The FD portion can add a charge being a signal output from the A pixel 302 and a charge being a signal output from the B pixel 303, by charge addition.

Here, an image based on the signal output from the A pixel 302 is called an A image, and an image based on the signal output from the B pixel 303 is called a B image. The A image and the B image are images to be used for autofocus. As will be described later, the system controlling unit 250 calculates a defocus amount based on the A image and the B image, focuses the photographing lens 203, and performs the AF process.

Besides, an image based on a signal obtained by adding the charge being the signal output from the A pixel 302 and the charge being the signal output from the B pixel 303 with the FD portion is called an addition image. The addition image is an image for recording or display.

(Constitutions of Image Processing Unit and System Controlling Unit)

Figure 4:
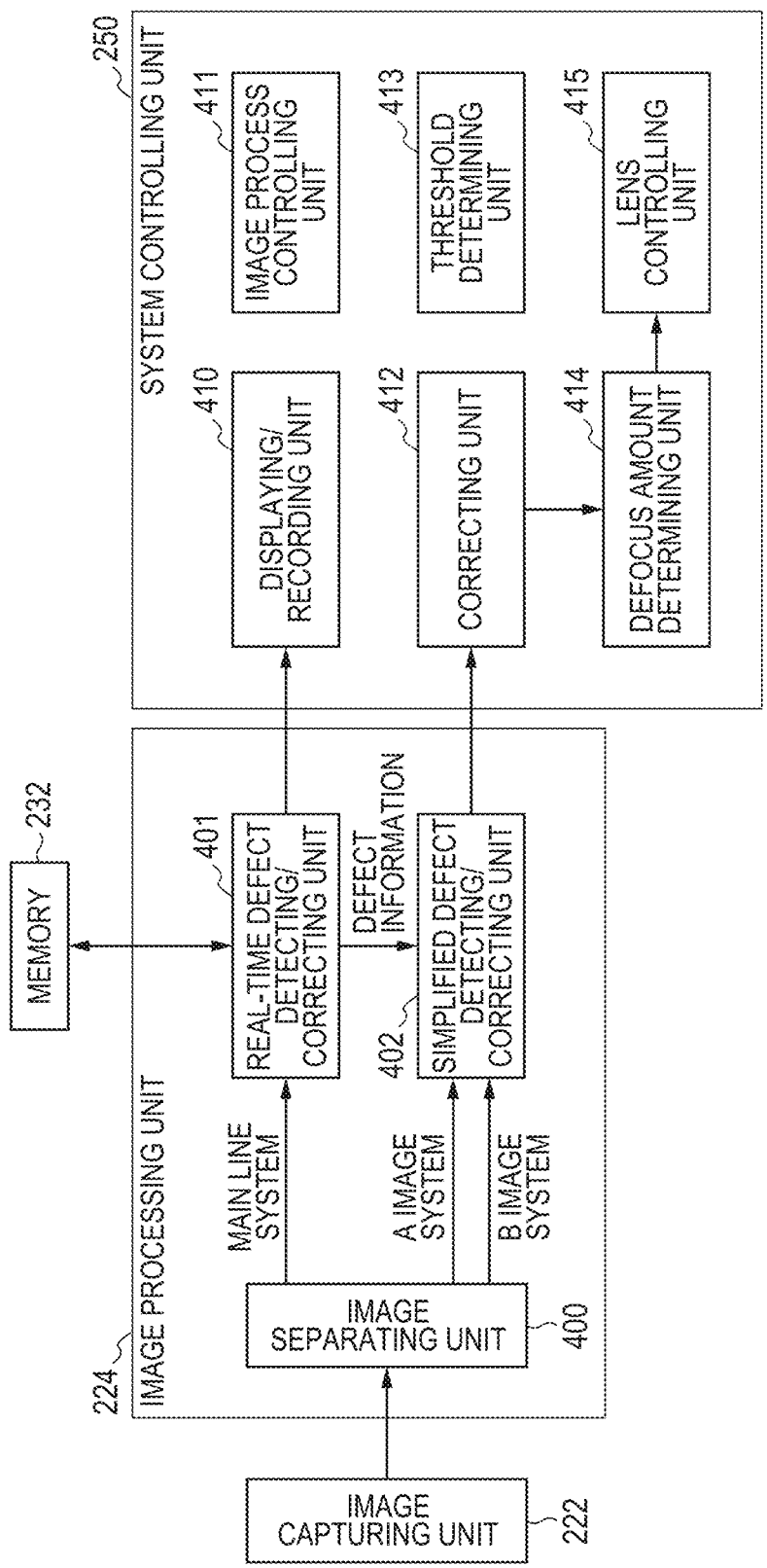
FIG. 4 is a block diagram for describing constitutions of an image processing unit and a system controlling unit.

Subsequently, a functional constitution of the image processing unit 224 will be described with reference to FIG. 4. Here, FIG. 4 is the block diagram for describing the constitutions of the image processing unit 224 and the system controlling unit 250.

The image processing unit 224 comprises an image separating unit 400, a real-time defect detecting/correcting unit 401, and a simplified defect detecting/correcting unit 402.

Under the control of the system controlling unit 250, the image separating unit 400 reads a signal from the image capturing element 300 constituting the image capturing unit 222, and outputs pixel values of the A image, the B image and the addition image. The image separating unit 400 separates the output signal of the unit pixel 301 into the pixel value of the A image and the pixel value of the B image.

The real-time defect detecting/correcting unit 401 detects a defective (flawed) pixel based on the pixel value of the addition image, and corrects the addition image. Here, the defective pixel is the unit pixel 301 which is abnormally output. The real-time defect detecting/correcting unit 401 outputs defect information, which is information related to the detected defective pixel, to the simplified defect detecting/correcting unit 402 and the system controlling unit 250.

The simplified defect detecting/correcting unit 402 detects the defective pixel based on the pixel value of the A image, and corrects the A image. Besides, the simplified defect detecting/correcting unit 402 detects the defective pixel based on the pixel value of the B image, and corrects the B image. In the digital camera 100, a circuit constituting the real-time defect detecting/correcting unit 401 and a circuit constituting the simplified defect detecting/correcting unit 402 are independent from each other.

Next, the functional constitution of the system controlling unit 250 will be described with reference to FIG. 4. The system controlling unit 250 comprises a displaying/recording unit 410, an image process controlling unit 411, a correcting unit 412, a threshold determining unit 413, a defocus amount determining unit 414, and a lens controlling unit 415.

The displaying/recording unit 410 performs control for displaying the addition image corrected by the real-time defect detecting/correcting unit 401 on the displaying unit 101, and performs control for recording the addition image on the recording medium 120.

The image process controlling unit 411 controls the image separating unit 400 to read a signal from the image capturing element 300.

The correcting unit 412, which is an example of a second correcting unit, further corrects the A image corrected by the simplified defect detecting/correcting unit 402, on the basis of the defect information. Besides, the correcting unit 412 further corrects the B image corrected by the simplified defect detecting/correcting unit 402, on the basis of the defect information.

The threshold determining unit 413 determines a defect detection threshold based on the defect information. As will be described later, the defect detection threshold is a threshold which is used for detecting the defective pixel by the simplified defect detecting/correcting unit 402. The defocus amount determining unit 414 determines the defocus amount based on the A image and the B image respectively corrected by the correcting unit 412.

The lens controlling unit 415 performs control for moving the focus lens based on the defocus amount determined by the defocus amount determining unit 414, and thus performs focusing by the photographing lens 203.

The addition image which is output from the image separating unit 400 is transferred to the displaying/recording unit 410 via the real-time defect detecting/correcting unit 401. This channel is called a main line system.

The A image which is output from the image separating unit 400 is transferred to the correcting unit 412 via the simplified defect detecting/correcting unit 402. This channel is called an A image system.

The B image which is output from the image separating unit 400 is transferred to the correcting unit 412 via the simplified defect detecting/correcting unit 402. This channel is called a B image system.

(AF Process)

For example, the AF process is performed when the electronic viewfinder is carried out, and when the shutter button 111 is half-depressed and the first shutter switch signal SW1 is generated. According to the setting or the like of the digital camera 100, the AF process may be performed only when the first shutter switch signal SW1 is generated.

The AF process is realized by an image reading process, a real-time defective pixel detecting process, a real-time correcting process, a threshold determining process, a simplified defective pixel detecting process, a simplified correcting process, a posterior correcting process, a defocus amount determining process, and a lens driving process.

(Image Reading Process)

Figure 5:
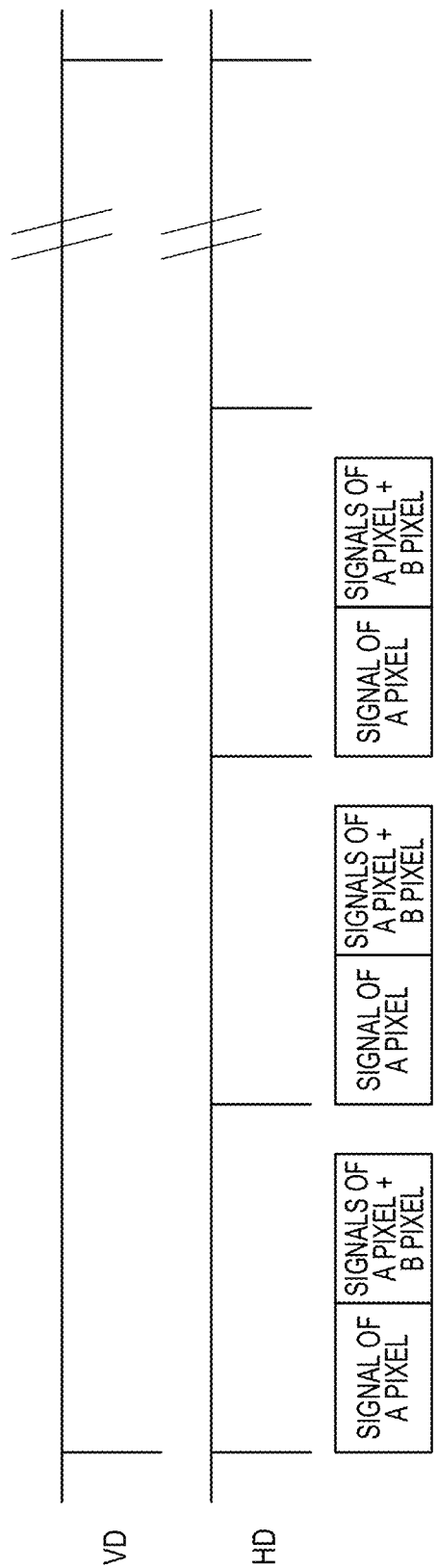
FIG. 5 is a diagram for describing signal reading timing from the image capturing element.

Subsequently, the image reading process will be described with reference to FIG. 5. Namely, FIG. 5 is the diagram for describing signal reading timing from the image capturing element 300. The image reading process is a process which is to read the signal of the image capturing element 300, read the pixel values of the A image, the B image and the addition image, and output the read pixel values to the real-time defect detecting/correcting unit 401 or the simplified defect detecting/correcting unit 402.

In FIG. 5, a vertical synchronization signal VD and a horizontal synchronization signal HD are shown. The vertical synchronization signal VD is a reference signal representing a start of reading of one frame, and the horizontal synchronization signal HD is a reference signal representing a start of reading of each line of one frame. The line of the frame represents a pixel row of the unit pixels 301 arranged in the horizontal direction.

When the vertical synchronization signal VD is generated, the image separating unit 400 starts reading the signal of the image capturing element 300 for one frame under the control of the image process controlling unit 411 of the system controlling unit 250. When the horizontal synchronization signal HD is generated, the image separating unit 400 starts reading the signal of the image capturing element 300 for a predetermined line of the frame under the control of the image process controlling unit 411.

When the horizontal synchronization signal HD is generated, the image separating unit 400 first reads the signal of only the A pixel 302 of the image capturing element 300 included in the image capturing unit 222, for the predetermined line of the frame. Next, the image separating unit 400 reads an addition signal obtained by adding the signal of the A pixel 302 and the signal of the B pixel 303 of the image capturing element 300, for the line of the same frame. The image separating unit 400 reads the A image signals and the addition signals of the entire screen by repeating the relevant reading a number of times corresponding to the number of effective lines.

The addition signal is a signal which is obtained by the charge addition of the charge being the signal output from the A pixel 302 and the charge being the signal output from the B pixel 303 by the FD portion included in the unit pixel 301. The addition image, which is an image obtained by digitizing the addition signal, can be used as an image for display and an image for record.

When the image separating unit 400 separately reads out the signal of the A pixel 302 and the signal of the B pixel 303 and digitally adds them, a noise deterioration due to the addition occurs. However, it is possible to add the signal of the A pixel 302 and the signal of the B pixel 303 while reducing the noise deterioration by performing the charge addition in the FD portion.

The signal of the A pixel 302 read by the image separating unit 400 from the image capturing unit 222 is digitized by the A/D converting unit of the image capturing unit 222, and becomes the pixel value of the A pixel 302. The pixel value of the A pixel 302 is called an A pixel value. Besides, the addition signal read by the image separating unit 400 from the image capturing unit 222 is digitized by the A/D converting unit of the image capturing unit 222, and becomes a pixel value corresponding to the addition signal of the unit pixel 301. The pixel value corresponding to the addition signal of the unit pixel 301 is called an addition pixel value. That is, an image made of the A pixel value is the A image, and an image made of the addition pixel value is the addition image.

Further, the image separating unit 400 subtracts the A pixel value of the A pixel 302 from the addition pixel value of the unit pixel 301. That is, the calculation "{(addition pixel value of unit pixel 301)−(A pixel value of A pixel 302)}" is performed to obtain the pixel value of the B pixel 303. The pixel value of the B pixel 303 is called a B pixel value. An image made of the B pixel value is the B image. Since the B pixel value is obtained by subtracting the A pixel value of the A pixel 302 from the addition pixel value, the B pixel value is a pixel value based on the signal of the B pixel 303.

Then, the image separating unit 400 outputs the pixel values of the A image, the B image and the addition image.

The method by which the image separating unit 400 generates the addition pixel value is an example of a first method, and the process of reading and obtaining the addition pixel value by the image separating unit 400 is an example of a process by a first obtaining unit. Besides, the method by which the image separating unit 400 generates the A pixel value and the B pixel value is an example of a second method, and the process of reading and obtaining the A pixel value and the B pixel value by the image separating unit 400 is an example of a process by a second obtaining unit.

In the present embodiment, the image separating unit 400 reads and outputs the A pixel values, the B pixel values and the addition pixel values for all the lines of one frame. However, to reduce power consumption, the image separating unit 400 may read and output the A pixel value, the B pixel value and the addition pixel value for only a specific line of one frame, and read and output only the addition pixel values for the lines other than the specific line.

Besides, in the present embodiment, the image separating unit 400 reads out all the A pixel values and the B pixel values in the horizontal direction. However, the image separating unit 400 may read out the A pixel value and the B pixel value only for a part of the periphery of the subject.

(Real-Time Defective Pixel Detecting Process)

Subsequently, the real-time defective pixel detecting process will be described.

The real-time defect detecting/correcting unit 401 detects and corrects the defective pixel for each line of the addition image output from the image separating unit 400. Here, as illustrated in FIG. 4, since the addition image transferred in the main line system is the image which is to be displayed and recorded, the defect correction must be performed accurately. The real-time defect detecting/correcting unit 401 obtains, from the image separating unit 400, the addition pixel values of a predetermined number of lines above and below the line to be processed, records the obtained addition pixel values in the memory 232, and refers them, thereby accurately detecting the defective pixels.

Figure 6:
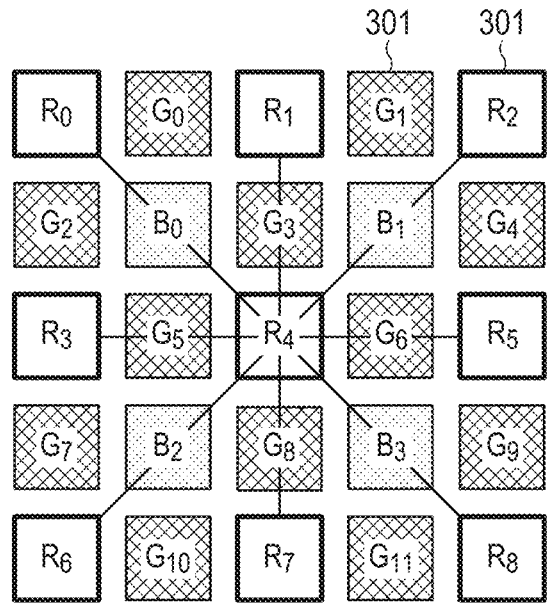
FIG. 6 is a diagram for describing an arrangement of unit pixels.

Next, the detail of the real-time defective pixel detecting process will be described with reference to FIG. 6. Namely, FIG. 6 is the diagram for describing an arrangement of the unit pixels 301. The real-time defective pixel detecting process is an example of a process by a first detecting unit.

In FIG. 6, $R_0$ to $R_8$ are the unit pixels 301 of which the respective color filters are "R", $G_0$ to $G_{11}$ are the unit pixels 301 of which the respective color filters are "G", and $B_0$ to $B_3$ are the unit pixels 301 of which the respective color filters are "B". Here, it is assumed that the target pixel which is the unit pixel 301 to be decided as where or not it is a defective pixel is $R_4$ in the center of FIG. 6.

Initially, the real-time defect detecting/correcting unit 401 decides whether or not there is an edge portion around the target pixel. Here, the edge portion is a portion where the pixel value abruptly changes. Such decision is performed as follows.

Firstly, the real-time defect detecting/correcting unit 401 obtains a maximum value PixMax and a minimum value PixMin of the addition pixel values of the same-color unit pixels 301 (that is, the unit pixels having the same color) arranged around the target pixel. In the example of FIG. 6, the real-time defect detecting/correcting unit 401 obtains the maximum value PixMax and the minimum value PixMin of the addition pixel values from $R_0$ to $R_3$ and from $R_5$ to $R_8$ arranged around the target pixel $R_4$.

Secondly, the real-time defect detecting/correcting unit 401 calculates a difference MaxMinDiff between the maximum value PixMax and the minimum value PixMin. Here, the difference MaxMinDiff is expressed by the following expression (1).

$$\text{MaxMinDiff} = \text{PixMax} - \text{PixMin} \quad (1)$$

Thirdly, when the difference MaxMinDiff is equal to or smaller than a first predetermined value previously determined, the real-time defect detecting/correcting unit 401 decides that there is no edge portion around the target pixel. In other cases, the real-time defect detecting/correcting unit 401 decides that there is the edge portion around the target pixel.

After the decision of the edge portion, the real-time defect detecting/correcting unit 401 detects the defective pixels in the following manner. That is, when there is the edge portion around the target pixel, the real-time defect detecting/correcting unit 401 decides that the target pixel is not a defective pixel.

When there is no edge portion around the target pixel, the real-time defect detecting/correcting unit 401 obtains an average value of the addition pixel values of the same-color unit pixels 301 arranged around the target pixel. In the example of FIG. 6, an average value PixAve of the addition pixel values from $R_0$ to $R_3$ and from $R_5$ to $R_e$ arranged around the target pixel $R_4$ is calculated. Then, the real-time defect detecting/correcting unit 401 calculates a difference PixDiff between an addition pixel value TargetPix of the target pixel and the average value PixAve. Here, the difference PixDiff is expressed by the following expression (2).

$$\text{PixDiff} = \text{TargetPix} - \text{PixAve} \quad (2)$$

The difference PixDiff is an example of a second reference value, and is a value based on the addition pixel values of the unit pixels 301 in a plurality of directions with reference to the target pixel.

Then, when the difference PixDiff is equal to or larger than a second predetermined value previously determined, the real-time defect detecting/correcting unit 401 decides that the target pixel is the defective pixel. On the other hand, when the difference PixDiff is smaller than the second predetermined value, the real-time defect detecting/correcting unit 401 decides that the target pixel is not a defective pixel. The real-time defect detecting/correcting unit 401 may decide that the target pixel is the defective pixel, based on whether or not the absolute value of the difference PixDiff is equal to or larger than the second predetermined value.

The real-time defect detecting/correcting unit 401 performs the decision like this for all the unit pixels 301, and detects the defective pixels.

Incidentally, the real-time defect detecting/correcting unit 401 may obtain the average value PixAve in the following manner. That is, the real-time defect detecting/correcting unit 401 obtains a difference between the addition pixel values of the two same-color unit pixels 301 which are arranged in the vertical direction with reference to the target pixel so as to sandwich the target pixel. Similarly, the real-time defect detecting/correcting unit 401 obtains differences between the addition pixel values of the unit pixels 301 arranged in the horizontal direction and the oblique direction respectively. Among these differences, the smallest value is set as the average value PixAve. The average value PixAve obtained in this manner is also a value which is based on the addition pixel values of the unit pixels 301 in a plurality of directions with reference to the target pixel. When the average value PixAve is obtained in this manner, the real-time defect detecting/correcting unit 401 does not have to decide the above edge portion.

(Real-Time Correcting Process)

Subsequently, the correcting process based on the addition image will be described with reference to FIG. 6. The real-time correcting process is an example of a process by a third correcting unit, and is a process of correcting the pixel value of the defective pixel detected in the real-time defective pixel detecting process based on the addition pixel value output by the image separating unit 400.

Firstly, the real-time defect detecting/correcting unit 401 determines a correction direction of the defective pixel detected in the real-time defective pixel detecting process. The correction direction is a direction in which the unit pixels 301 used for correcting the defective pixel are arranged. Here, a process of determining the correction direction is an example of a process by a direction determining unit.

More specifically, the real-time defect detecting/correcting unit 401 obtains a difference Diff1 between the addition pixel values of the two same-color unit pixels 301 which are arranged in a first oblique direction with reference to the target pixel being the defective pixel to be processed by the real-time correcting process, so as to sandwich the target pixel. Besides, the real-time defect detecting/correcting unit 401 obtains a difference Diff2 between the addition pixel values of the two same-color unit pixels 301 which are arranged in the vertical direction with reference to the target pixel, so as to sandwich the target pixel. Besides, the real-time defect detecting/correcting unit 401 obtains a difference Diff3 between the addition pixel values of the two same-color unit pixels 301 which are arranged in a second oblique direction with reference to the target pixel, so as to sandwich the target pixel. Besides, the real-time defect detecting/correcting unit 401 obtains a difference Diff4 between the addition pixel values of the two same-color unit pixels 301 which are arranged in the horizontal direction with reference to the target pixel, so as to sandwich the target pixel. As the directions of 45° from the vertical direction and the horizontal direction, there are two directions, that is, a direction connecting $R_0$ and $R_8$ and a direction connecting $R_2$ and $R_6$ in FIG. 6. One of these two directions is the first oblique direction, and the other is the second oblique direction.

Assuming that the target pixel is $R_4$ in FIG. 6, the differences Diff1 to Diff4 can be obtained by the following expressions (3) to (6). The differences Diff1 to Diff4 are change amounts of the addition pixel values in the first oblique direction, the vertical direction, the second oblique direction and the horizontal direction, respectively.

$$\text{Diff1} = |(\text{addition pixel value of } R_0) - (\text{addition pixel value of } R_8)| \quad (3)$$

$$\text{Diff2} = |(\text{addition pixel value of } R_1) - (\text{addition pixel value of } R_7)| \quad (4)$$

$$\text{Diff3} = |(\text{addition pixel value of } R_2) - (\text{addition pixel value of } R_6)| \quad (5)$$

$$\text{Diff4} = |(\text{addition pixel value of } R_3) - (\text{addition pixel value of } R_5)| \quad (6)$$

Then, the real-time defect detecting/correcting unit 401 determines the direction corresponding to the smallest value among the differences Diff1 to Diff4 as the correction direction. Here, since the fact that the difference is minimum means that there is no edge portion between the two unit pixels 301 corresponding to the minimum difference, the addition pixel value of the defective pixel can be corrected to an appropriate value by the addition pixel values of the two unit pixels 301.

Secondly, the real-time defect detecting/correcting unit 401 sets, as the addition pixel value of the defective pixel, the average value of the addition pixel values of the two same-color unit pixels 301 which are arranged in the correction direction with reference to the target pixel, so as to sandwich the target pixel. For example, when the difference Diff1 becomes minimum, the first oblique direction corresponding to the difference Diff1 is the correction direction, and an addition pixel value PixCorrect after the correction of the defective pixel is calculated by the following expression (7).

$$\text{PixCorrect} = ((\text{addition pixel value of } R_0) + (\text{addition pixel value of } R_8))/2 \quad (7)$$

The real-time defect detecting/correcting unit 401 performs the above correction to all the defective pixels detected in the real-time defective pixel detecting process.

The real-time defect detecting/correcting unit 401 may use the average value of the addition pixel values of all the same-color unit pixels 301 around the defective pixel as the addition pixel value of the defective pixel. Besides, the real-time defect detecting/correcting unit 401 may use, as the addition pixel value of the defective pixel, the average value of the addition pixel values of all the unit pixels 301 corresponding to the differences, among the differences Diff1 to Diff4, equal to or lower than a third predetermined threshold previously determined.

Besides, the real-time defect detecting/correcting unit 401 generates the defect information which is information of the defective pixel detected in the real-time defective pixel detecting process, and outputs the generated defect information to the simplified defect detecting/correcting unit 402 and the system controlling unit 250. The defect information includes the coordinates of the defective pixel, the correction direction of the defective pixel, and the defect level. The defect level indicates the difference between the addition pixel value of the target pixel and the difference PixDiff which is the reference value and expressed by the expression (2). The larger the defect level, the more the output of the defective pixel is not accurate.

For example, the real-time defect detecting/correcting unit 401 transfers the corrected addition pixel value to the displaying/recording unit 410 of the system controlling unit 250 by using the memory 232. However, the real-time defect detecting/correcting unit 401 transfers the addition pixel value of the unit pixel 301 not decided as the defective pixel in the real-time defective pixel detecting process to the displaying/recording unit 410 without correction. The corrected addition image is composed by the addition pixel value transferred by the real-time defect detecting/correcting unit 401 to the displaying/recording unit 410.

(Threshold Determining Process)

Figure 7:
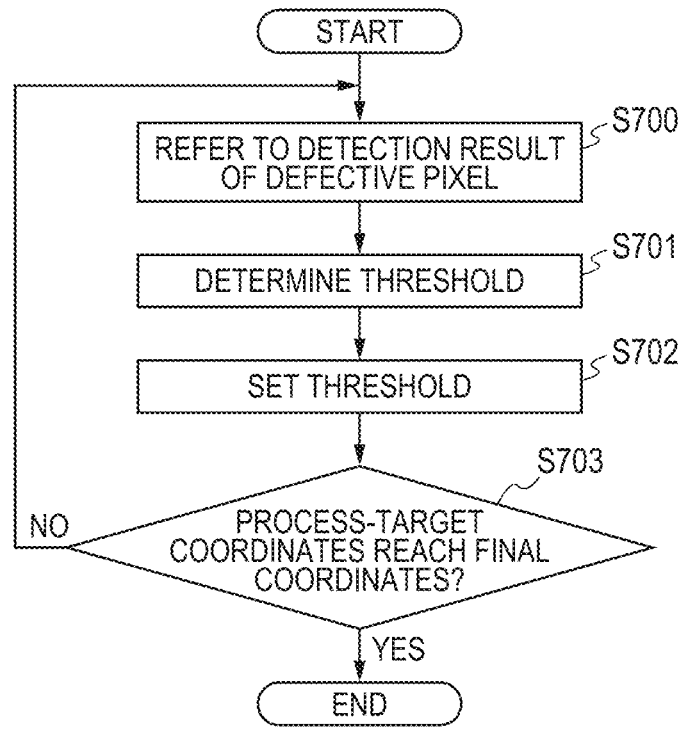
FIG. 7 is a flow chart for describing a threshold determining process.
Figures 8, 9:
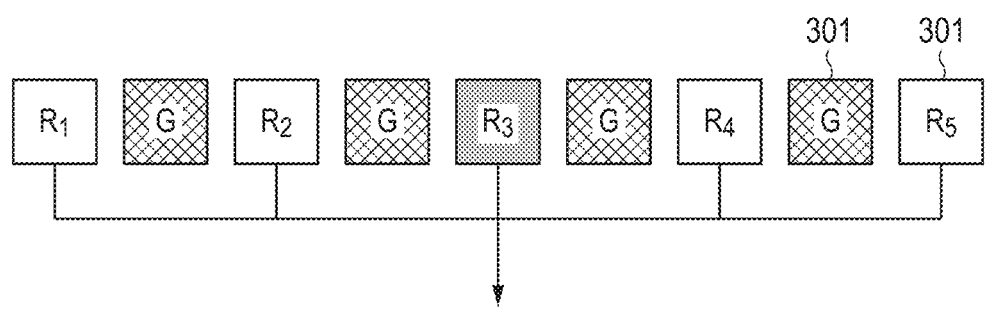
FIG. 8 is a diagram indicating a threshold determination table.
FIG. 9 is a diagram for describing simplified defect correction.

Subsequently, the threshold determining process will be described with reference to FIGS. 7 and 8. Namely, FIG. 7 is the flow chart for describing the threshold determining process, and FIG. 8 is the diagram indicating a determination table to be used for determining the defect detection threshold. The threshold determining process is a process of determining the defect detection threshold to be used in the later-described simplified defective pixel detecting process, and this process is an example of a process to be performed by a threshold determining unit. In the simplified defective pixel detecting process, it is easier to detect defective pixel as the defect detection threshold is smaller.

In the threshold determining process, the defect detection threshold is determined for each of the coordinates of the unit pixels 301 in the image capturing element 300. The target coordinates are the coordinates for which the defect detection threshold is determined. For example, the initial value of the target coordinates is the top left coordinates of the unit pixels 301.

In S700, the threshold determining unit 413 refers to the detection result of the defective pixel of the real-time defect detecting/correcting unit 401 with respect to the unit pixel 301 of the target coordinates. When the real-time defect detecting/correcting unit 401 detects a defective pixel with respect to the unit pixel 301 of the target coordinates, the real-time defect detecting/correcting unit 401 refers to the defect information or the like and thus obtains the defect level of the defective pixel.

In S701, the threshold determining unit 413 determines a defect detection threshold for the unit pixel 301 of the target coordinates, based on the determination table illustrated in FIG. 8. In FIG. 8, defect level thresholds Th_A1, Th_A2 and Th_A3 are shown. The threshold Th_A1 is the highest, and the threshold Th_A3 is the lowest. Besides, in FIG. 8, defect detection thresholds Th_B1, Th_B2, Th_B3 and Th_B4 are shown. The threshold Th_B1 is the lowest, the threshold Th_B2 is lower next to the threshold Th_B1, the threshold Th_B3 is lower next to the threshold Th_B2, and the threshold Th_B4 is the highest.

As indicated by FIG. 8, the threshold determining unit 413 determines a lower defect detection threshold as the defect level of the unit pixel 301 of the target coordinates is higher. For example, when the defect level is equal to or higher than the threshold Th_A1, the threshold determining unit determines the defect detection threshold to be the minimum threshold Th_B1. Thus, in the simplified defect detecting process, it is possible to surely detect the defective pixel which has a very large defect. Besides, when the unit pixel 301 of the target coordinates is not detected as a defective pixel, the threshold determining unit 413 determines the defect detection threshold for the unit pixel 301 of the target coordinates to be the maximum threshold Th_B4. Thus, it is possible to suppress or restrain the unit pixel 301 of the target coordinates from being detected as a defective pixel in the simplified defective pixel detecting process. By determining the defect detection threshold in this manner, accuracy of the simplified defect detecting process is improved, and thus accuracy of the defocus amount is increased.

In S702, the threshold determining unit 413 sets the defect detection threshold determined in S701 most recent, to the defect detection threshold to be used when the simplified defect detecting/correcting unit 402 detects the defective pixel of the unit pixel 301 of the target coordinates.

In S703, the threshold determining unit 413 decides whether or not the process-target coordinates reach the final coordinates of the image capturing element 300. The threshold determining unit 413 ends the process of the flow chart illustrated in FIG. 8 when the target coordinates are the final coordinates of the image capturing element 300. On the other hand, when the target coordinates are not the final coordinates of the image capturing element 300, the threshold determining unit 413 sets the target coordinates to the coordinates of the next unit pixel 301, and returns the process to S700.

(Simplified Defective Pixel Detecting Process)

Subsequently, the simplified defective pixel detecting process will be described with reference to FIG. 9. Namely, FIG. 9 is the diagram for describing the simplified defective pixel detecting process, and shows a part of a predetermined line of the unit pixels 301. Here, the simplified defective pixel detecting process is an example of a process by a second detecting unit.

The simplified defective pixel detecting process is performed by the simplified defect detecting/correcting unit 402. Incidentally, it is undesirable to incur costs to the simplified defect detecting/correcting unit 402. For this reason, unlike the real-time defect detecting/correcting unit 401, the simplified defect detecting/correcting unit 402 is not constituted to write pixel values of a plurality of lines in the memory 232 and read pixel values from the memory 232. The simplified defect detecting/correcting unit 402 performs the simplified defective pixel detecting process and the later-described simplified correcting process by referring to only the pixel values of the unit pixels 301 arranged in the horizontal direction equivalent to a predetermined direction. Besides, the simplified defect detecting/correcting unit 402 performs the simplified defective pixel detecting process and the later-described simplified correcting process for each line by obtaining the A pixel value and the B pixel value for each line from the image separating unit 400.

The simplified defective pixel detecting process and the later-described simplified correcting process are performed by the simplified defect detecting/correcting unit 402. Therefore, these processes can be performed in parallel with the real-time defective pixel detecting process and the real-time correcting process to be performed by the real-time defect detecting/correcting unit 401. However, it should be noted that the defect information is used in the simplified correcting process, and the defect detection threshold is used in the simplified defective pixel detecting process. Therefore, in the simplified defective pixel detecting process and the simplified correcting process, the simplified defective pixel detecting process and the simplified correcting process are sequentially performed on the unit pixel 301 for which it was decided in the real-time defective pixel detecting process whether or not there was the defective pixel and for which the defect detection threshold was determined.

Symbols $R_1$ to $R_5$ in FIG. 9 respectively indicate the unit pixels 301 of which the color filters are "R", and symbols G in FIG. 9 respectively indicate the unit pixels 301 of which the color filters are "G". Here, it is assumed that the target pixel which is the unit pixel 301 to be decided whether it is the defective pixel the pixel $R_3$ in the center of FIG. 9.

Initially, a first detecting process of detecting the defective pixel based on the A pixel value obtained from the image separating unit 400 will be described. Here, since the defective pixel is detected based on the A pixel value, it is possible to detect whether or not the A pixel 302 of the unit pixel 301 has a defect.

Firstly, the simplified defect detecting/correcting unit 402 obtains a median value Md which is an example of a first reference value. More specifically, the simplified defect detecting/correcting unit 402 obtains the median value Md of the A pixel values of the comparison reference pixels and the A pixel value of the target pixel. Here, in a case where the unit pixels 301 having the same color as that of the target pixel are called same-color pixels, the comparison reference pixels are the two same-color pixels on the right side of the target pixel and the two same-color pixels on the left side of the target pixel. In the example illustrated in FIG. 9, the comparison reference pixels of the target pixel $R_3$ are the four unit pixels 301 of $R_1$, $R_2$, $R_4$ and $R_5$. Namely, the simplified defect detecting/correcting unit 402 selects the median value Md by applying a median filter to the A pixel values of the comparison reference pixels and the A pixel value of the target pixel as in the following expression (8).

$$Md=\text{Median}(A \text{ pixel value of } R_1, A \text{ pixel value of } R_2, A \text{ pixel value of } R_3, A \text{ pixel value of } R_4, A \text{ pixel value of } R_5) \quad (8)$$

Secondly, the simplified defect detecting/correcting unit 402 obtains the defect detection threshold of the coordinates corresponding to the target pixel. Here, the defect detection threshold is a value which is determined in the above threshold determining process.

Thirdly, the simplified defect detecting/correcting unit 402 obtains a difference Diff between the obtained median value Md and the A pixel value of the target pixel. The difference Diff is expressed by the following expression (9).

$$\text{Diff}=|(A \text{ pixel value of target pixel})-Md| \quad (9)$$

Fourthly, the simplified defect detecting/correcting unit 402 decides whether or not the obtained difference Diff is larger than the obtained defect detection threshold. When the obtained difference Diff is larger than the obtained defect detection threshold, the simplified defect detecting/correcting unit 402 decides that the target pixel is the defective pixel. On the other hand, when the obtained difference Diff is equal to or smaller than the obtained defect detection threshold, the simplified defect detecting/correcting unit decides that the target pixel is not the defective pixel.

The above process is the first detecting process.

The simplified defect detecting/correcting unit 402 performs the first detecting process for the unit pixels 301 of all the lines being the defect detection targets.

Next, a second detecting process of detecting the defective pixel based on the B pixel value obtained from the image separating unit 400 will be described. Here, since the defective pixel is detected based on the B pixel value, it is possible to detect whether or not the B pixel 303 of the unit pixel 301 has a defect.

The second detecting process is substantially the same process as the above first detecting process. However, in the second detecting process, the B pixel value is used instead of the A pixel value.

(Simplified Correcting Process)

Subsequently, the simplified correcting process will be described. The simplified correcting process is a process of correcting the pixel value of the defective pixel detected in the simplified defective pixel detecting process, on the basis of the A pixel value of the A image or the B pixel value of the B image, and the simplified correcting process is an example of process to be performed by a correcting unit.

Initially, a first correcting process of correcting the pixel value of the defective pixel based on the A pixel value will be described. In the first correcting process, the pixel value of the A pixel 302 decided to have the defect in the first detecting process is corrected.

Firstly, the simplified defect detecting/correcting unit 402 determines a correction direction of the defective pixel detected in the first detecting process of the simplified defective pixel detecting process.

More specifically, by referring to the defect information obtained from the real-time defect detecting/correcting unit 401, the simplified defect detecting/correcting unit 402 decides whether or not there is the defect information related to the coordinates of the defective pixel detected in the first detecting process. When there is no defect information related to the coordinates of the defective pixel detected in the first detecting process, the simplified defect detecting/correcting unit 402 determines the correction direction to be the horizontal direction. On the other hand, when there is the defect information related to the coordinates of the defective pixel detected in the first detecting process, the simplified defect detecting/correcting unit 402 determines the correction direction as the correction direction included in the defect information.

Secondly, the simplified defect detecting/correcting unit 402 decides whether the defective pixel detected in the first detecting process of the simplified defect detecting process is a target defective pixel to be corrected by the simplified defect detecting/correcting unit 402 or a non-target defective pixel.

Among the defective pixels detected in the first detecting process, the target defective pixel is a defective pixel which is detected in the real-time defective pixel detecting process corresponding to the defective pixel and of which the correction direction is the horizontal direction. The pixel value of the target defective pixel is the target to be corrected in the simplified correcting process.

Among the defective pixels detected in the first detecting process, the non-target defective pixel is the defective pixel which is other than the target defective pixel (that is, the defective pixel excluded from the target defective pixel) and of which the correction direction is a direction other than the horizontal direction. The pixel value of the non-target defective pixel is the target to be corrected in the later-described posterior correcting process.

Figures 10, 11:
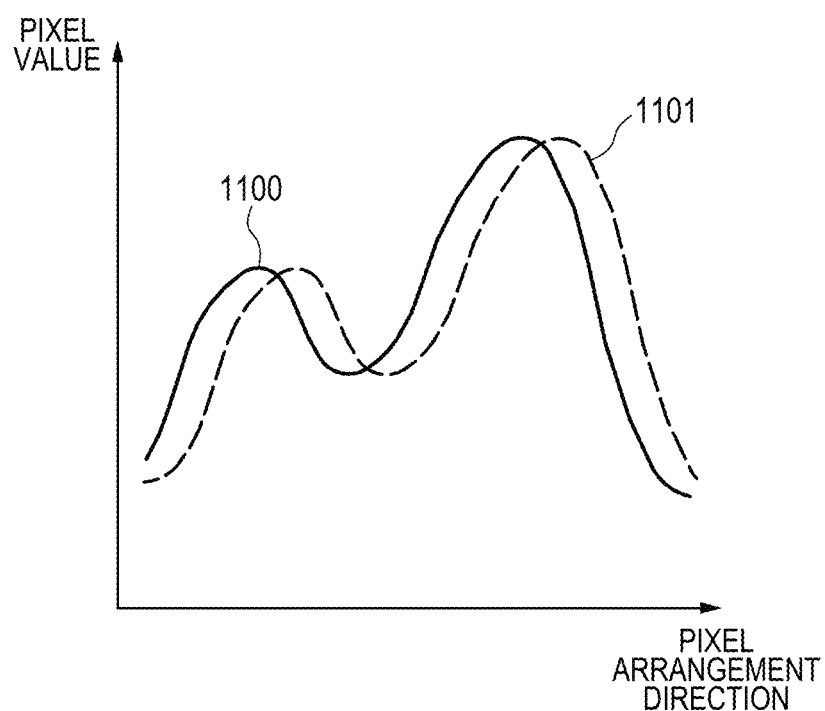
FIG. 10 is a diagram for describing a changeover of correcting methods.
FIG. 11 is a diagram for describing a determining method of a defocus amount.

The above points are summarized in FIG. 10. Namely, FIG. 10 is the diagram for describing changeover of the correcting methods. As illustrated in FIG. 10, when the correction direction is the horizontal direction, the pixel value is corrected in the simplified correcting process. On the other hand, when the correction direction is other than the horizontal direction, that is, when the correction direction is the oblique direction or the vertical direction, the pixel value is corrected in the posterior correcting process (posterior correction).

Thirdly, the simplified defect detecting/correcting unit 402 performs the simplified correction for the target defective pixel.

The simplified correction is a correction for replacing the A pixel value of the defective pixel detected in the first detecting process with the median value Md obtained in the first detecting process for the relevant defective pixel. If it is assumed that the A pixel value of the defective pixel after the correction is PixCorrect, the simplified correction can be expressed by the following expression (10).

$$PixCorrect = Md \qquad (10)$$

As the simplified correction, it may be possible to perform correction for replacing the A pixel value of the defective pixel detected in the first detecting process with an average value of the A pixel values of the two unit pixels 301 adjacent in the horizontal direction of the relevant defective pixel. In the example of FIG. 9, this simplified correction can be expressed by the following expression (11).

$$PixCorrect = ((A \text{ pixel value of } R_2) + (A \text{ pixel value of } R_4))/2 \qquad (11)$$

However, it is assumed that $R_3$ of FIG. 9 is the defective pixel detected in the first detecting process.

As just described, since the simplified correction is very simple, the circuit scale of the simplified defect detecting/correcting unit 402 is small, so that there are cost merits. However, correction capability is the minimum. For this reason, in the present embodiment, as will be described later, the posterior correcting process is performed to improve accuracy of the correction of the A image and the B image.

Fourthly, the simplified defect detecting/correcting unit 402 notifies the correcting unit 412 in the system controlling unit 250 of information of the non-target defective pixel.

More specifically, the simplified defect detecting/correcting unit 402 turns on a predetermined A pixel flag in the memory 232, and informs the correcting unit 412 that there is a correction direction of the defective pixel detected in the first detecting process other than the horizontal direction. Incidentally, it is assumed that the A pixel flag has been turned off as the initial value before the simplified correcting process.

Further, the simplified defect detecting/correcting unit 402 converts the A pixel value of the non-target defective pixel to a value corresponding to the correction direction. In the present embodiment, "0" is set when the correction direction is the vertical direction, "1" is set when the correction direction is the first oblique direction, and "2" is set when the correction direction is the second oblique direction.

The above process is the first correcting process.

The simplified defect detecting/correcting unit 402 performs the first correcting process to all the defective pixels detected in the first detecting process.

The simplified defect detecting/correcting unit 402 sets the A pixel value of the unit pixel 301 not decided as a defective pixel in the first detecting process to a value other than "0", "1" and "2". For example, if it is assumed that the A pixel value is represented by 14 bits, the A pixel value can take a value from "0" to "16383". Among them, as described above, since each of "0", "1" and "2" represents the correction direction of the defective pixel, the simplified defect detecting/correcting unit 402 sets the A pixel value of the unit pixel 301 not decided as the defective pixel in the first detecting process to have the value from "3" to "16383".

Next, a second correcting process of correcting the pixel value of the defective pixel based on the B pixel value will be described. In the second correcting process, the pixel value of the B pixel 303 decided to have a defect in the second detecting process is corrected.

The second correcting process is substantially the same process as the above first correcting process. In the second correcting process, however, a B pixel value is used instead of the A pixel value, and the defective pixel detected in the second detecting process is used instead of the defective pixel detected in the first detecting process. In addition, a predetermined B pixel flag is used instead of the predetermined A pixel flag.

The simplified defect detecting/correcting unit 402 performs the second correcting process to all the defective pixels detected in the second detecting process.

The simplified defect detecting/correcting unit 402 sets the B pixel value of the unit pixel 301 not decided as a defective pixel in the second detecting process to a value other than "0", "1", and "2". For example, if it is assumed that the B pixel value is represented by 14 bits, the B pixel value can take a value from "0" to "16383". Among them, as described above, since each of "0", "1" and "2" represents the correction direction of the defective pixel, the simplified defect detecting/correcting unit 402 sets the B pixel value of the unit pixel 301 not decided as the defective pixel in the second detecting process to have the value from "3" to "16383".

The simplified defect detecting/correcting unit 402 transfers the corrected pixel value to the correcting unit 412 of the system controlling unit 250 by using, for example, the memory 232. Incidentally, each of the pixel values "0", "1" and "2" transferred here represents the correction direction of the defective pixel. The corrected A image and B image are formed by the pixel values transferred by the simplified defect detecting/correcting unit 402 to the correcting unit 412.

(Posterior Correcting Process)

Subsequently, the posterior correcting process will be described. In the posterior correcting process, the correcting unit 412 of the system controlling unit 250 further corrects the A image and the B image respectively based on the A pixel value and the B pixel value corrected in the simplified correcting process, and the posterior correcting process is an example of a process to be performed by the second correcting unit.

Initially, a first posterior correcting process in which the correcting unit 412 further corrects the A image based on the A pixel value corrected in the simplified correcting process will be described.

Firstly, the correcting unit 412 writes the A pixel value transferred from the simplified defect detecting/correcting unit 402 into the memory 232.

Secondly, the correcting unit 412 decides whether or not the predetermined A pixel flag in the memory 232 is on. Here, the predetermined A pixel flag is set in the simplified correcting process. When, this flag is on, it indicates that there is something other than the horizontal direction in the correction direction of the defective pixel. When the predetermined A pixel flag is not on, the correcting unit 412 ends the first posterior correcting process without correcting the A image.

Thirdly, when the predetermined A pixel flag is on, the correcting unit 412 corrects each A pixel value which is any one of "0", "1" and "2" by performing the process same as the real-time correcting process described with reference to FIG. 6. More specifically, the correcting unit performs the following process.

The A pixel value which is any one of "0", "1" and "2" is set as the pixel value of the target pixel to be processed. The correcting unit 412 sets, as the pixel value of the defective pixel, the average value of the A pixel values of the two same-color unit pixels 301 which are arranged in the correction direction with reference to the target pixel, so as to sandwich the target pixel. Incidentally, as described above, "0" indicates that the correction direction is the vertical direction, "1" indicates that the correction direction is the first oblique direction, and "2" indicates that the correction direction is the second oblique direction.

The above process is the first posterior correcting process.

Next, a description will be given of a second posterior correcting process in which the correcting unit 412 further corrects the B image based on the B pixel value corrected in the simplified correcting process.

The second posterior correcting process is substantially the same process as the above first posterior correcting process. However, in the second posterior correcting process, the B pixel value is used instead of the A pixel value, and the predetermined B pixel flag is used instead of the predetermined A pixel flag.

(Defocus Amount Determining Process)

Subsequently, the defocus amount determining process will be described with reference to FIG. 11. The defocus amount determining process is a process of determining the defocus amount of the photographing lens 203. Namely, FIG. 11 is the diagram for describing the pixel value of the A image and the pixel value of the B image. The horizontal axis of FIG. 11 represents the pixel arrangement direction, and the vertical axis of FIG. 11 represents the pixel value. Besides, in FIG. 11, an A signal 1100 represents the A image which has been subjected to the posterior correcting process, and a B signal 1101 represents the B image which has been subjected to the posterior correcting process.

In the example of FIG. 11, since the photographing lens 203 is in a defocused state with respect to the image capturing element 300, the A signal 1100 is shifted to the left side and the B signal 1101 is shifted to the right side. The defocus amount determining unit 414 of the system controlling unit 250 determines the defocus amount of the photographing lens 203 by calculating a shift amount between the A signal 1100 and the B signal 1101 by well-known correlation calculation or the like.

(Lens Driving Process)

Subsequently, the lens driving process will be described. The lens driving process is a process of focusing the photographing lens 203 by driving the photographing lens 203.

The lens controlling unit 415 of the system controlling unit 250 calculates and determines a focus lens driving amount from the defocus amount determined in the defocus amount determining process. Then, the lens controlling unit 415 performs control for moving the focus lens so that the position of the focus lens included in the photographing lens 203 becomes the position of the focus lens corresponding to the focus lens driving amount. Hereby, the focusing of the photographing lens 203 is performed.

(Effect)

As described above, the simplified defect detecting/correcting unit 402 detects and corrects the defective pixel on the basis of the defect detection threshold which is obtained based on the information of the defective pixel generated by the real-time defect detecting/correcting unit 401. Besides, each of the simplified defect detecting/correcting unit 402 and the real-time defect detecting/correcting unit 401 can be constituted by the independent circuit. Therefore, since the correction of the image for display or recording and the correction of the image for autofocus can be performed in parallel, it is possible to secure high-speed process for the entire digital camera 100. Besides, the correction of the image for autofocus is performed on the basis of the defect detection threshold which is obtained based on the information of the defective pixel generated by the real-time defect detecting/correcting unit 401. Therefore, since the simplified defect detecting/correcting unit 402 can detect the defective pixel with high accuracy, accuracy of the correction of the image for autofocus becomes high.

More specifically, the real-time defect detecting/correcting unit 401 decides whether or not the target pixel is the defective pixel, on the basis of the difference PixDiff which is the defect level based on the pixel value of the target pixel and the average value PixAve. Here, the difference PixDiff is the value which is based on the pixel values of the unit pixels 301 in the plurality of directions with reference to the target pixel. Therefore, the real-time defect detecting/correcting unit 401 can detect the defective pixel with high accuracy.

Besides, based on the A pixel value or the B pixel value of the target pixel, the median value Md, and the defect detection threshold, the simplified defect detecting/correcting unit 402 decides whether or not the target pixel is the defective pixel. The median value Md is the A pixel value or the B pixel value included in the pixel row in the horizontal direction. Besides, the defect detection threshold is determined based on the result of high-accuracy defective pixel detection by the real-time defect detecting/correcting unit 401.

Therefore, since the simplified defect detecting/correcting unit 402 can detect the defective pixel with high accuracy, accuracy of the correction of the image for autofocus becomes high.

Further, in the simplified defect detecting/correcting unit 402, an appropriate correction can be performed only when the correction direction is the horizontal direction. However, the pixel values of the plurality of lines may be required as in the case where the correction direction is the vertical direction, the first oblique direction or the second oblique direction. In the case like this, the correction in the relevant correction direction cannot be performed.

However, the simplified defect detecting/correcting unit 402 does not correct the defective pixel when the correction direction of the detected defective pixel is other than the horizontal direction, and the correcting unit 412 of the system controlling unit 250 performs the correction based on the correction direction. This correction direction is included in the defect information generated by the real-time defect detecting/correcting unit 401.

Therefore, the correcting unit 412 can correct, with high accuracy, the pixel value of the defective pixel which cannot be corrected with high accuracy by the simplified defect detecting/correcting unit 402. Thus, accuracy of the A image and the B image increases, so that it becomes possible to accurately determine the defocus amount.

Second Embodiment

Subsequently, a second embodiment of the present invention will be described. In the present embodiment, the same components as those in the first embodiment are denoted respectively by the same reference numerals, and detailed descriptions thereof will be omitted.

(Constitutions of Image Processing Unit and System Controlling Unit)

Figure 12:
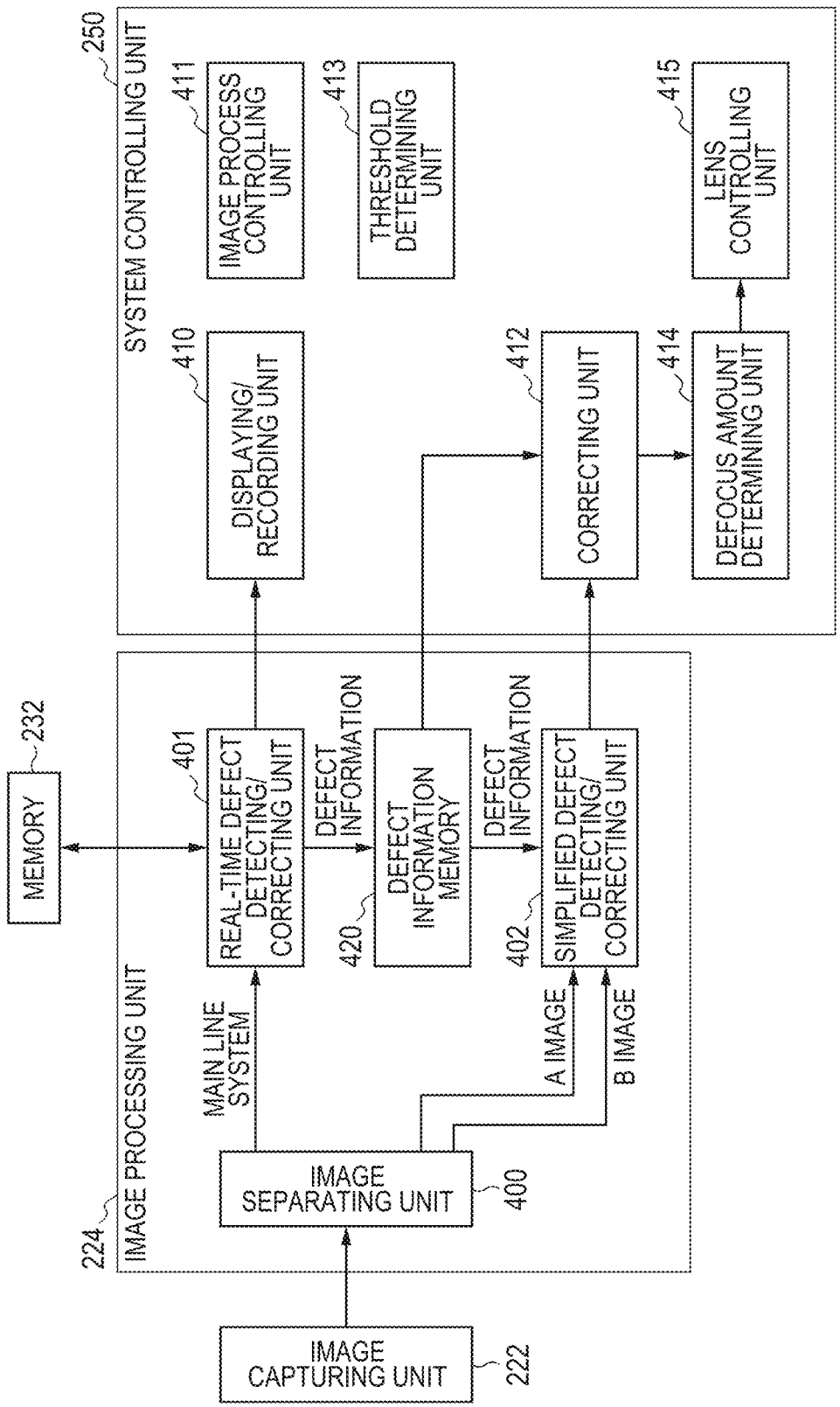
FIG. 12 is a block diagram for describing constitutions of an image processing unit and a system controlling unit according to a second embodiment.

Constitutions of the image processing unit 224 and the system controlling unit 250 according to the second embodiment will be described with reference to FIG. 12. The present embodiment is different from the first embodiment in the point that the image processing unit 224 comprises a defect information memory 420. As well as the first embodiment, under the control of the system controlling unit 250, the image separating unit 400 reads a signal from the image capturing element 300 constituting the image capturing unit 222, and outputs an A image, a B image, and a pixel value of an addition image. The image separating unit 400 separates the output signal of the unit pixel 301 into the pixel value of the A image and the pixel value of the B image.

The real-time defect detecting/correcting unit 401 detects a defective pixel based on the pixel value of the addition image, and corrects the addition image. Here, the defective pixel is the unit pixel 301 which is abnormally output. The real-time defect detecting/correcting unit 401 outputs defect information, which is information related to the detected defective pixel, to the defect information memory 420, the simplified defect detecting/correcting unit 402 and the system controlling unit 250. In the defect information memory 420, coordinates, a defect level and a correction pattern have been stored as the defect information included in the addition image in association with each signal. It is preferable that the defect information memory be capable of holding the defect information for a plurality of frames. Thus, it becomes possible to perform correction decision to an image for ranging from the defect information of the plurality of frames and to perform correction decision to the image for ranging from the defect information of the past frame. Further, by storing the defect information in association with data of the image for ranging, it is possible in the posterior process after photographing to correct the defect. Besides, the pixel which is decided as the defective pixel over the plurality of frames can also be kept stored thereafter. Incidentally, there is a case where the defect coordinates of the addition image transferred in the main line system are different from the defect coordinates of the A image and the B image being the images for ranging. To cope with the case like this, it is possible to perform coordinate conversion under the control of the system controlling unit 250, at a time when data writing is performed from the real-time defect detecting/correcting unit 401 to the defect information memory 420 or when data storing is performed on the defect information memory 420.

The simplified defect detecting/correcting unit 402 detects the defective pixel based on the pixel value of the A image, and corrects the A image. Besides, the simplified defect detecting/correcting unit 402 detects the defective pixel based on the pixel value of the B image, and corrects the B image. In the digital camera 100, a circuit constituting the real-time defect detecting/correcting unit 401 and a circuit constituting the simplified defect detecting/correcting unit 402 are independent from each other.

Third Embodiment

Subsequently, a third embodiment of the present invention will be described. In the present embodiment, the same components as those in the first embodiment and the second embodiment are denoted respectively by the same reference numerals, and detailed descriptions thereof will be omitted.

(Constitution of Image Processing Unit and System Controlling Unit)

Figure 13:
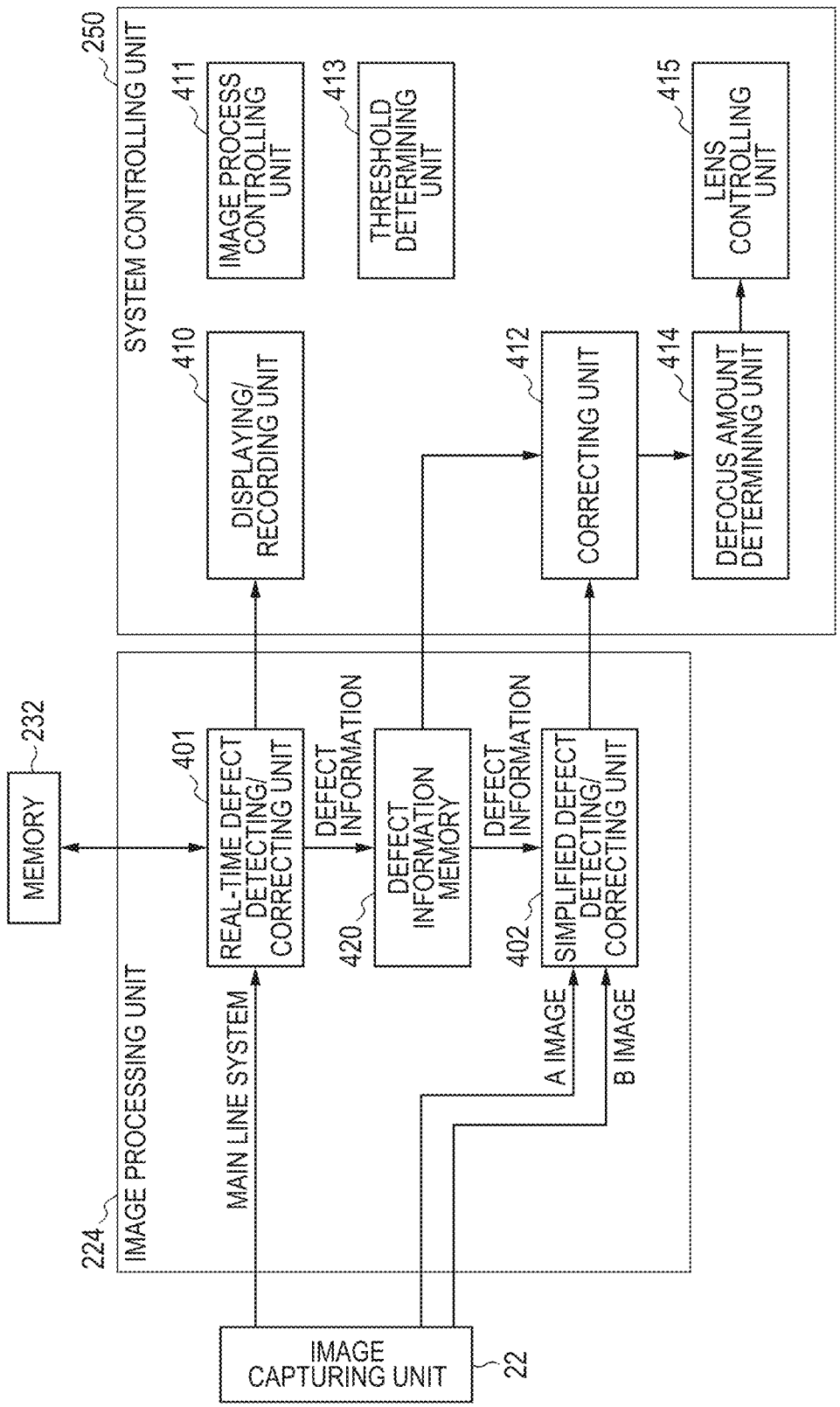
FIG. 13 is a block diagram for describing constitutions of an image processing unit and a system controlling unit according to a third embodiment.

The constitutions of the image processing unit 224 and the system controlling unit 250 according to the third embodiment will be described with reference to FIG. 13. The present embodiment is different from the first embodiment in the point that the image processing unit 224 comprises the defect information memory 420 as well as the second embodiment, and the present embodiment is different from the second embodiment in the point that the image processing unit 224 does not comprise the image separating unit 400. Besides, an image capturing unit 22 is configured to be able to simultaneously output two systems of images, one of which is an image (addition image) of the main-line system to be used for displaying and recording and the other of which is a ranging image to be used for ranging.

Also in such a case where the image capturing unit 22 has the two systems of image outputs, under the control of the system controlling unit 250, the signal is read from the image capturing element 300 constituting the image capturing unit 22, and the pixel values of the A image, the B image and the addition image are output.

The real-time defect detecting/correcting unit 401 detects the defective pixel based on the pixel value of the addition image, and corrects the addition image. Here, the defective pixel is the unit pixel 301 which is abnormally output. The real-time defect detecting/correcting unit 401 outputs the defect information, which is information related to the detected defective pixel, to the defect information memory 420, the simplified defect detecting/correcting unit 402 and the system controlling unit 250. In the defect information memory 420, coordinates, a defect level and a correction pattern have been stored as the defect information included in the addition image. As well as the second embodiment, the defect information memory 420 can hold the defect information for a plurality of frames.

The simplified defect detecting/correcting unit 402 detects the defective pixel based on the pixel value of the A image, and corrects the A image. Besides, the simplified defect detecting/correcting unit 402 detects the defective pixel based on the pixel value of the B image, and corrects the B image. In the digital camera 100, a circuit constituting the real-time defect detecting/correcting unit 401 and a circuit constituting the simplified defect detecting/correcting unit 402 are independent from each other.

Incidentally, in the third embodiment, there are a plurality of constitutions as the constitution of the image capturing unit 22 having the two systems of image outputs. As an example, there is a case where, with respect to a pixel portion that the image capturing element 300 included in the image capturing unit 22 comprises a photoelectric converting unit of photoelectrically converting incident light and outputting an electric signal, a circuit of processing the electric signal is a laminated-type image capturing element constituted by a laminated structure. By using the laminated-type image capturing element, it is possible to output the signals independently from a plurality of areas in an image capturing surface. As another example, there is a case where the image capturing unit 22 comprises a plurality of image capturing elements. In this case, a signal obtained by adding signals from the plurality of image capturing elements may be used as a signal of the main line system. Besides, any one of the image capturing elements may be set as a master, and the output from the master may be used as a signal of the main line system. In this case, the image capturing element other than the master may be set as a slave for the ranging image to be used for ranging.

Incidentally, in the first to third embodiments, the image processing unit 224 has the processing system for ranging in addition to the main line system. However, the present invention is not limited to the two systems, and three or more systems may be used. In this case, the defect information obtained from one real-time defect detecting/correcting unit 401 can be used in another system, so that it is possible to obtain further effects. Besides, although the system provided other than the main line system is used as the system for ranging, it may possible to use this system for other purposes such as for photometry, for subject detection and the like.

Even in this case, it is possible to have the same effect by using the wound information obtained in the main line system.

Other Embodiments

In the above embodiment, as illustrated shown in FIG. 4, the real-time defect detecting/correcting unit 401 performs the real-time correcting process using the memory 232. However, instead of the memory 232, the real-time defect detecting/correcting unit 401 may independently comprise a reference RAM. To perform the real-time defective pixel detecting process and the real-time correcting process at high speed, the reference RAM may be realized by an SRAM (static random access memory).

Even in this case, the simplified defect detecting/correcting unit 402 can detect the defective pixel with high accuracy without using or mounting a costly circuit such as the reference RAM, so that accuracy of correction of the image for autofocus is high.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-205522, filed Oct. 19, 2016, and Japanese Patent Application No. 2017-164419, filed Aug. 29, 2017, which are hereby incorporated by reference herein in their entirety.

What is claimed is:

1. An image capturing apparatus comprising:
    an image capturing element configured to be arranged as a plurality of unit pixels;
    a memory storing instructions; and
    at least one processor configured to exegete the instructions to function as:
        a first obtaining unit configured to obtain a pixel value of a first image generated by a first method, on the basis of an output signal of the image capturing element;
        a second obtaining unit configured to obtain a pixel value of a second image for autofocus generated by a second method different from the first method, on the basis of the output signal of the image capturing element;
        a first detecting unit configured to detect, in the unit pixels, a defective pixel which is abnormally output, on the basis of the pixel value of the first image;
        a second detecting, unit configured to detect a defective pixel based on information of the defective pixel detected by the first detecting unit and the pixel value of the second image; and
        a correcting unit configured to correct the second image, by correcting the pixel value of the second image corresponding to the defective pixel detected by the second detecting unit.

2. The image capturing apparatus according to claim 1, wherein the second detecting unit is configured to detect, with respect to each of the decision-target unit pixels being a decision target of the defective pixel, the defective pixel by deciding whether or not the decision-target unit pixel is the defective pixel, on the basis of the pixel value of the second image corresponding to the decision-target unit pixel, a first reference value based on the pixel value of the second image corresponding to the unit pixel included in a pixel row arranged in a predetermined direction and including the decision-target unit pixel, and a threshold based on the information of the defective pixel detected by the first detecting unit.

3. The image capturing apparatus according to claim 2, wherein
    the first detecting unit is configured to detect, with respect to each of the decision-target unit pixels being the decision target of the defective pixel, the defective pixel by deciding whether or not the decision-target unit pixel is the defective pixel on the basis of a defect level which indicates a difference between the pixel value of the first image corresponding to the decision-target unit pixel and a second reference value based on the pixel value of the first image corresponding to the unit pixels arranged in a plurality of directions based on the decision-target unit pixel as a reference, and
    wherein the at least one processor is further configured to execute the instructions to function as: a threshold determining unit configured to determine the threshold based on the defect level.

4. The image capturing apparatus according to claim 3, wherein the threshold determining unit is configured to determine the threshold to a lower value as the defect level is higher.

5. The image capturing apparatus according to claim 2, wherein the correcting unit is configured to correct the pixel value of the second image corresponding to the defective pixel detected by the second detecting unit, on the basis of the pixel value of the second image corresponding to the unit pixel included in the pixel row including the defective pixel detected by the second detecting unit and arranged in the predetermined direction.

6. The image capturing apparatus according to claim 2, wherein the at least one processor is further configured to execute the instructions to function as:
    a direction determining unit configured to determine a correction direction which is a direction of the pixel row of the unit pixels including the defective pixel, with respect to each the defective pixel detected by the first detecting unit, wherein when the defective pixel detected by the second detecting unit is a target defective pixel in which the correction direction determined by the direction determining unit with respect to the defective pixel detected by the first detecting unit and corresponding to the defective pixel detected by the second detecting unit is the same as the predetermined direction, the correcting unit is configured to correct the pixel value of the second image corresponding to the target defective pixel on the basis of the pixel value of the second image corresponding to the unit pixel included in the pixel row including the target defective pixel and arranged in the predetermined direction.

7. The image capturing apparatus according to claim 6, wherein the at least one processor is further configured to execute the instructions to function as:

a second correcting unit configured to further correct, with respect to a non-target defective pixel which is the defective pixel obtained from the defective pixels detected by the second detecting unit excluding the target defective pixel, the second image corrected by the correcting unit, by correcting the pixel value corresponding to the non-target defective pixel the second image corrected by the correcting unit on the basis of the pixel value of the second image corrected by the correcting unit and corresponding to the unit pixel included in the pixel row including the non-target defective pixel and arranged in the correction direction.

8. The image capturing apparatus according to claim 7, wherein, when a change amount of the pixel value of the first image corresponding to the unit pixel arranged in a first direction with respect to the defective pixel is smaller than any change amount of the pixel value of the first image corresponding to the unit pixel arranged in each of respective predetermined directions other than the first direction with respect to the defective pixel, the direction determining unit is configured to determine the first direction as the correction direction.

9. The image capturing apparatus according to claim 8, wherein the correcting unit is configured to notify the second correcting unit of information of coordinates of the non-target defective pixel and the correction direction, on the basis of the determination of the direction determining unit.

10. The image capturing apparatus according to claim 9, wherein the correcting unit is configured to notify the second correcting unit of the information of the coordinates of the non-target defective pixel and the correction direction, by storing the information of the correction direction to the pixel value of the second image corresponding to the non-target defective pixel.

11. The image capturing apparatus according to Claire 7, wherein the at least one processor is further configured to execute the instructions to function as: a defocus amount determining unit configured to determine a defocus amount based on the second image further corrected by the second correcting unit.

12. The image capturing apparatus according to claim 7, wherein the at least one processor is further configured to execute the instructions to function as:

a third correcting unit configured to correct the first image by correcting the pixel value of the first image corresponding to the defective pixel detected by the first detecting unit, on the basis of the pixel value of the first image corresponding to the unit pixel arranged in the correction direction based on the defective pixel detected by the first detecting unit as a reference; and a controlling unit configured to perform control of displaying or recording the first image corrected by the third correcting unit.

13. The image capturing apparatus according to claim 1, wherein the unit pixel is constituted by a first photoelectric converting unit and a second photoelectric converting unit, the first method is a method of generating the first image in which a value based on a value obtained by adding together a value of an output signal of the first photoelectric converting unit and a value of an output signal of the second photoelectric converting unit is used as the pixel value, the second image includes an A image and a B image, and the second method includes a method of generating the A image in which a value based on the value of the output signal of the first photoelectric converting unit is used as the pixel value, and a method of generating the B image in which a value based on the value of the output signal of the second photoelectric converting unit is used as the pixel value.

14. The image capturing apparatus according to claim 13, wherein the second detecting unit is configured to detect the defective pixel on the basis of the information of the defective pixel detected by the first detecting unit and the pixel value of the A image, and to detect the defective pixel on the basis of the information of the defective pixel detected by the first detecting unit and the pixel value of the B image, and the correcting unit is configured to correct the A image by correcting the pixel value of the A image corresponding to the defective pixel detected based on the A image by the second detecting unit, and to correct the B image by correcting the pixel value of the B image corresponding to the defective pixel detected based on the B image by the second detecting unit.

15. The image capturing apparatus according to claim 1, wherein a circuit which constitutes the first detecting unit, and a circuit which constitutes the second detecting unit and the correcting unit are independent from each other.

16. The image capturing apparatus according to claim 1, wherein the image capturing element comprises two systems of image outputs, one of which outputs the pixel value of the first image for displaying, and the other of which outputs the pixel value of the second image for autofocus.

17. A controlling method for an image capturing apparatus having an image capturing element equipped with a plurality of unit pixels, the controlling method comprising:

a first obtaining step of obtaining a pixel value of a first image generated by first method, on the basis of an output signal of the image capturing element;

a second obtaining step of obtaining a pixel value of a second image for autofocus generated by a second method different from the first method, on the basis of the output signal of the image capturing element;

a first detecting step of detecting a defective pixel which is the unit pixel abnormally output, on the basis of the pixel value of the first image;

a second detecting step of detecting a defective pixel based on information of the defective pixel detected in the first detecting step and the pixel value of the second image; and a correcting step of correcting the second image, by correcting the pixel value of the second image corresponding to the defective pixel detected in the second detecting step.

18. A non-transitory computer-readable storage medium which stores a program for controlling an image capturing apparatus having an image capturing element equipped with a plurality of unit pixels, the program causing a computer to perform:
- a first obtaining step of obtaining a pixel value of a first image generated by a first method, on the basis of an output signal of the image capturing element;
- a second obtaining step of obtaining a pixel value of a second image for autofocus generated by a second method different from the first method, on the basis of the output signal of the image capturing element;
- a first detecting step of detecting a defective pixel which is the unit pixel abnormally output, on the basis of the pixel value of the first image;
- a second detecting step of detecting a defective pixel based on information of the defective pixel detected in the first detecting step and the pixel value of the second image; and
- a correcting step of correcting the second image, by correcting the pixel value of the second image corresponding to the defective pixel detected in the second detecting step.

* * * * *